United States Patent [19]
Brophy

[11] 3,988,993
[45] Nov. 2, 1976

[54] PALLET FOR REGISTERING AND SECURING A WORKPIECE

[75] Inventor: Robert V. Brophy, Gloucester, Mass.

[73] Assignee: USM Corporation, Boston, Mass.

[22] Filed: July 26, 1974

[21] Appl. No.: 492,072

Related U.S. Application Data

[63] Continuation-in-part of Ser. No. 410,038, Oct. 26, 1973, abandoned.

[52] U.S. Cl.............................. 112/121.12; 12/52; 12/146 C
[51] Int. Cl.²........................................ D05B 21/00
[58] Field of Search.................. 112/121.15, 121.12, 112/121.11, 102, 2; 12/146 C, 52

[56] References Cited
UNITED STATES PATENTS

| | | | |
|---|---|---|---|
| 297,998 | 5/1884 | Kinsley | 12/52 |
| 1,174,750 | 3/1916 | Mayo | 12/52 X |
| 1,569,231 | 1/1926 | Mayo | 112/121.15 X |
| 1,942,128 | 1/1934 | Sommer | 112/121.15 |
| 2,049,175 | 7/1936 | Regan | 112/146 C |
| 3,172,379 | 3/1965 | Light | 112/121.12 |
| 3,174,447 | 3/1965 | Bono | 112/121.12 |
| 3,483,834 | 12/1969 | Bennison | 112/121.15 |
| 3,680,508 | 8/1972 | Baig et al. | 112/121.12 |
| 3,721,202 | 3/1973 | Dodsworth | 112/121.15 |

*Primary Examiner*—H. Hampton Hunter
*Attorney, Agent, or Firm*—Ralph D. Gelling; Richard B. Megley; Vincent A. White

[57] ABSTRACT

This invention involves a pallet for use in automatic stitching machines which insures proper registration of a workpiece with respect to the stitching instruments and maintenance of such registration during machine operation. Basically, the pallet is constructed of two outer plates hinged together to form a sandwich type arrangement having openings therein to allow for access of the stitching instruments to the workpiece. These openings are generally identical and are accurately located with respect to the stitching instruments. In the interior of the pallet means are provided for removably securing the workpiece in accurate registration with the stitching instruments. The access openings may be designed to receive overlay or overlapping portions of a composite workpiece and additional outer or interior plates may be provided to accommodate a wide variety of workpieces. The pallet is removably secured to the supporting carriage of the automatic stitching machine in a position which is fixed in relation to the stitching head.

8 Claims, 9 Drawing Figures

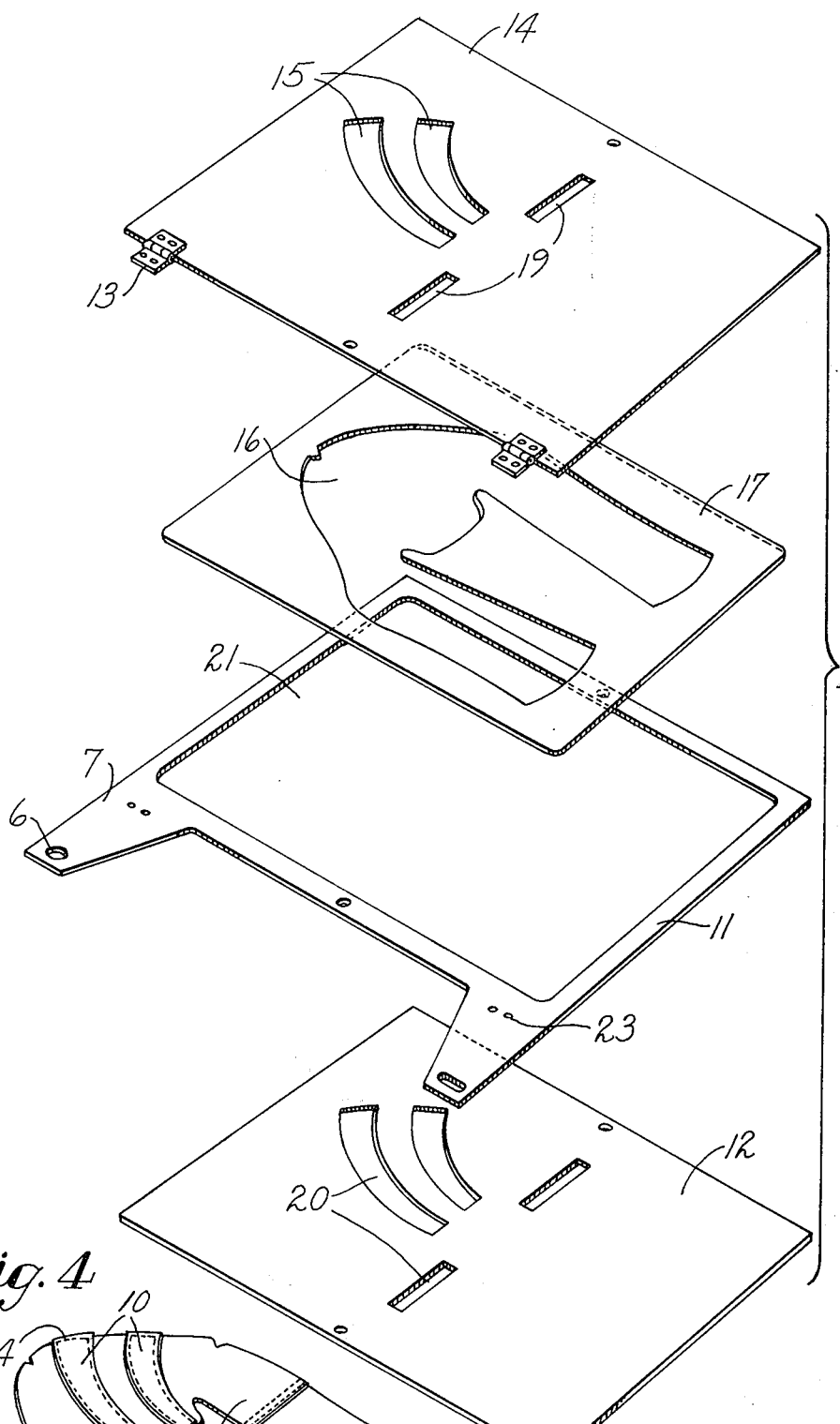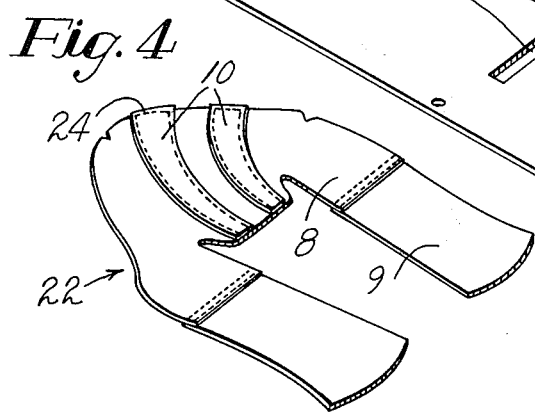

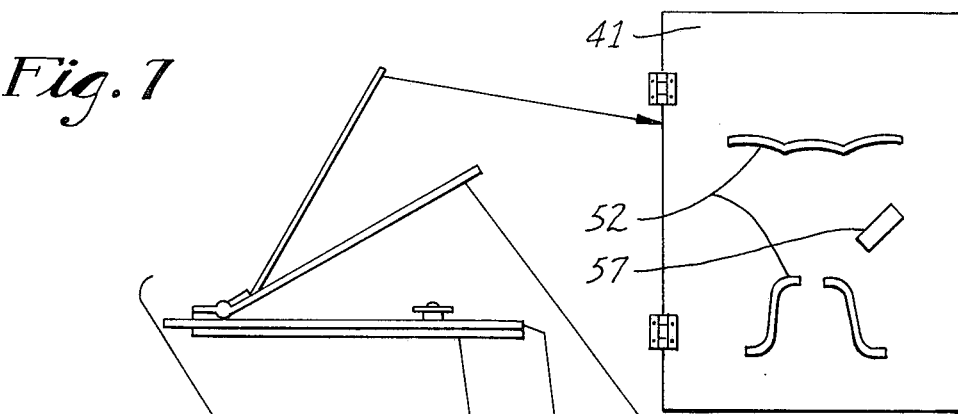
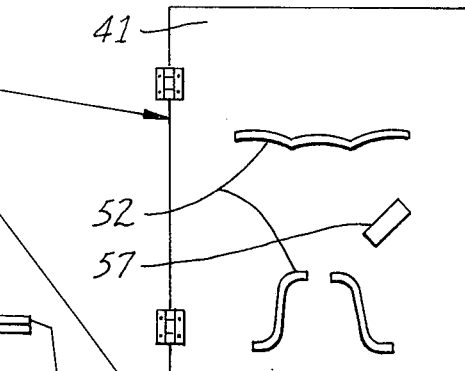
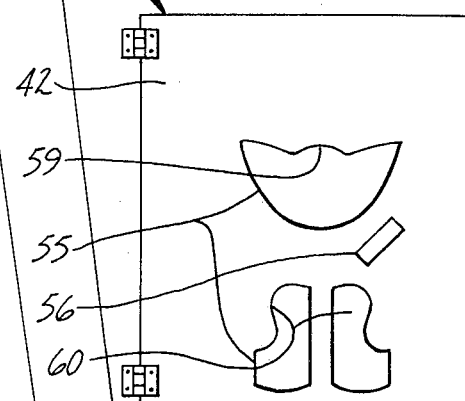
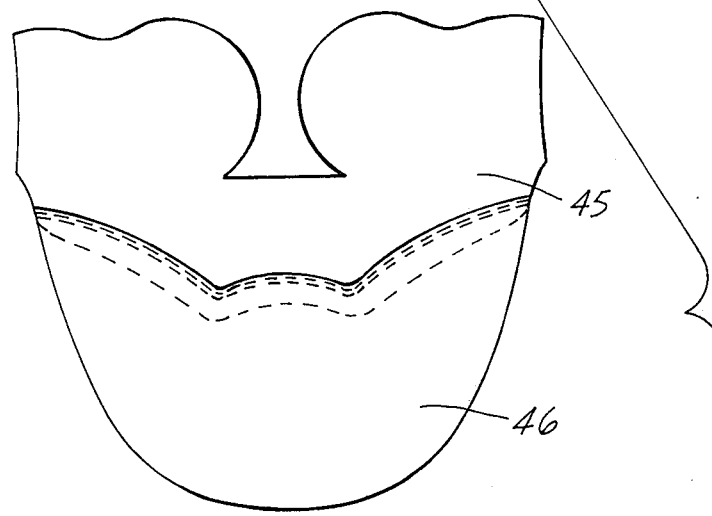
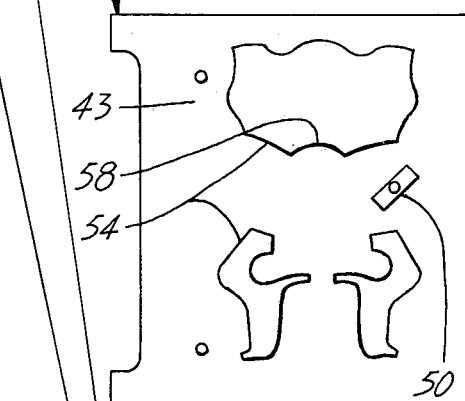
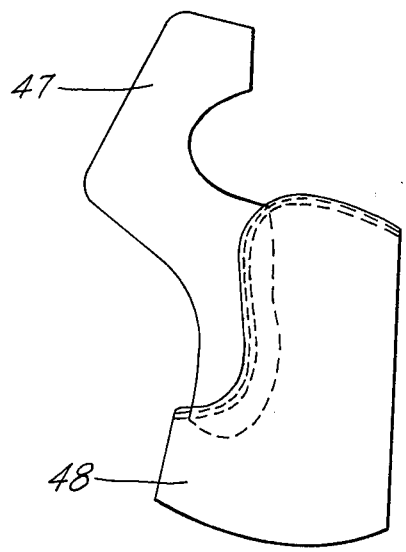
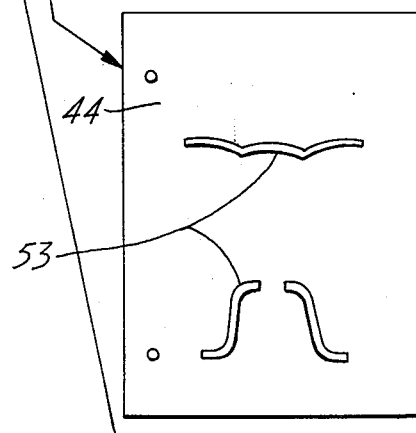

PALLET FOR REGISTERING AND SECURING A WORKPIECE

This is continuation-in-part of continuation-in-partof U.S. application for patent Ser. No. 410,038 filed Oct. 26, 1973 now abandoned.

BACKGROUND OF THE INVENTION

The increasing cost of labor has provided great incentives for expanding the use of automation. However, there are many industrial operations which, because of their complexity, have steadfastly resisted attempts at automatic control. It is those operations that involve the application of a tool to a workpiece and include the requirement of relative movement between the tool and workpiece that are among the most difficult to automate. Examples of such operations are sewing, punching, leather tooling, embroidery and decorative stitching. In all of these operations, it is necessary to move either the tool or the workpiece through intricate patterns. Generally, the tool is in a fixed position and an operator manipulates the workpiece under the tool according to a predetermined pattern. Until recently, automatic movement of the workpiece according to a predetermined pattern has been severly limited.

However, the advent of numerical and direct digital controls has provided readily programmable means for automatically controlling movement of a workpiece through complicated patterns. In such systems apparatus is provided which can support the workpiece for movement along several axes. For example, in an automatic sewing operation, motor operated carriages are provided which respond to pulses from a digital control to support and move the workpiece along two axes. In order to accomplish such movement on a reliably repetitive basis, it was observed that a device for firmly securing the workpiece on the supporting carriage in fixed registration relative to the location of the operating instruments is required. Where the workpieces to be operated upon in the machine are made of relatively hard material such as metal, the workpieces may be readily and securely clamped in a fixed position relative to the operating instruments of the machine. However, where the workpieces are of softer material such as plastic, cloth or leather, the workpieces may be damaged by the securing clamps. Moreover, where the workpiece materials are particularly soft and floppy as with sheets of cloth or leather, accurate holding of the workpiece requires such a plurality of clamps as to make changes between successive workpieces so difficult and time consuming as to vitiate the economic advantage derived from the speed of the automatic controls.

The operator of an automatic stitching machine is no longer required to direct the workpiece under the needle. He need only place the workpiece accurately on the supporting carriage, remove it after the operation is complete, and replace the workpiece. This, however, can be quite difficult when accuracy becomes important as, for example, when a workpiece consists of serveral pieces including overlays and inserts. In the case where overlays are to be sewn to a base the stitching must run close to the border of the overlay, therefore making accurate registration essential.

The stitching machine for which this invention is adapted is comprised of a standard sewing machine from which the feeding means and workpiece support have been removed. These elements are replaced by a numerically controlled motor operated carriage which is capable of movement through a predetermined pattern along two dimensional coordinates which are referenced to the stitching instruments. The pattern is digitized, that is, reduced on a point-by-point basis to known values within the coordinate system and placed on magnetic tape for insertion into the numerical control. The workpiece is mounted on the support carriage in registration with the stitching instruments by means of a pallet.

In this operation, it is anticipated that the operator will have several pallets and proceed as follows: a workpiece will be mounted on the pallet and placed on the supporting carriage for application to the stitching instruments, while the first workpiece is proceeding through the stitching operation a second workpiece will be mounted for processing on an additonal pallet. In this manner substantially continuous operation of the stitching machine will be accomplished.

It should be remembered that in this type of machine the stitching instruments are stationary and the automatically controlled carriage will always be directed in the same path in relation to these instruments. Accordingly, if the operator can place each workpiece in the same position on the carriage, the machine will complete the product without significant variation. This registration problem becomes crucial when overlay or overlapping portions must be secured to the base piece of a composite workpiece as is often required for decorative purposes in the manufacture of shoes. Since such portions need to be stitched as close as possible to their periphery, it becomes essential that the overlay be placed on the pallet in a position which is fixed in relation to the stitching instruments.

It is therefore the object of this invention to construct a pallet which provides means for accurately registering a composite or individual workpiece on an automatically controlled carriage in fixed relation to the stitching instruments. This pallet must also provide means for maintaining this registration during the machine cycle while facilitating removal and replacement of the workpiece without jeopardizing accurate registration.

BRIEF DESCRIPTION OF THE INVENTION

The pallet of this invention consists of several plate members which are assembled in a sandwich type arrangement having an inner cavity which receives the workpiece. A base plate is constructed with means for receiving the mounting bracket of the support carriage and has a cover plate secured thereto by hinges. Matching openings are provided in the cover and base plates for allowing needle access to the workpiece. These openings are constructed to conform to the desired stitching pattern and with the workpiece cavity are placed in accurate registration with the stitching instruments. Means may be provided in the base plate for receiving a template which outlines the workpiece cavity according to its shape and size. This template may be constructed in a variety of ways depending on the desired accuracy of registration and mechanical means may be provided to secure the pallet in the assembled condition.

In the event that the workpiece consists of a base portion and overlays or overlapping portions additional cavities are constructed in the cover plate so that they are also accurately registered with the stitching instruments. Since the cover plate is fixed to the base plate and pivots to enclose the base plate workpiece cavity, the latter cavity may be referenced to the overlay cavity without loss of accuracy.

In operation, the cover plate is pivoted to expose the inner cavity, the base portion of the workpiece is placed in the inner cavity and the cover plate is pivoted to enclose this base portion, thereby securing it in place. If there are overlays they may then be placed in the cover plate cavity and the pallet is ready for engagement with the automatically controlled carriage.

BRIEF DESCRIPTION OF THE DRAWINGS

This instant invention is more fully described in conjunction with the appended drawing which shows preferred embodiments of the invention and in said drawing:

FIG. 3 is an exploded perspective view of the pallet showing each element thereof; and FIG. 4 is a perspective view of the completed composite workpiece.

FIG. 7 is a plan view of the various plates of a second alternate embodiment for a composite workpiece with overlapping parts;

FIG. 8 is a plan view of the vamp and tip portions of the workpiece associated with the pallet of FIG. 7; and FIG. 9 is a plan view of the quarter and foxing portions of the workpiece associated with the pallet of FIG. 7.

THE PREFERRED EMBODIMENT OF THE INVENTION

Figure 2:
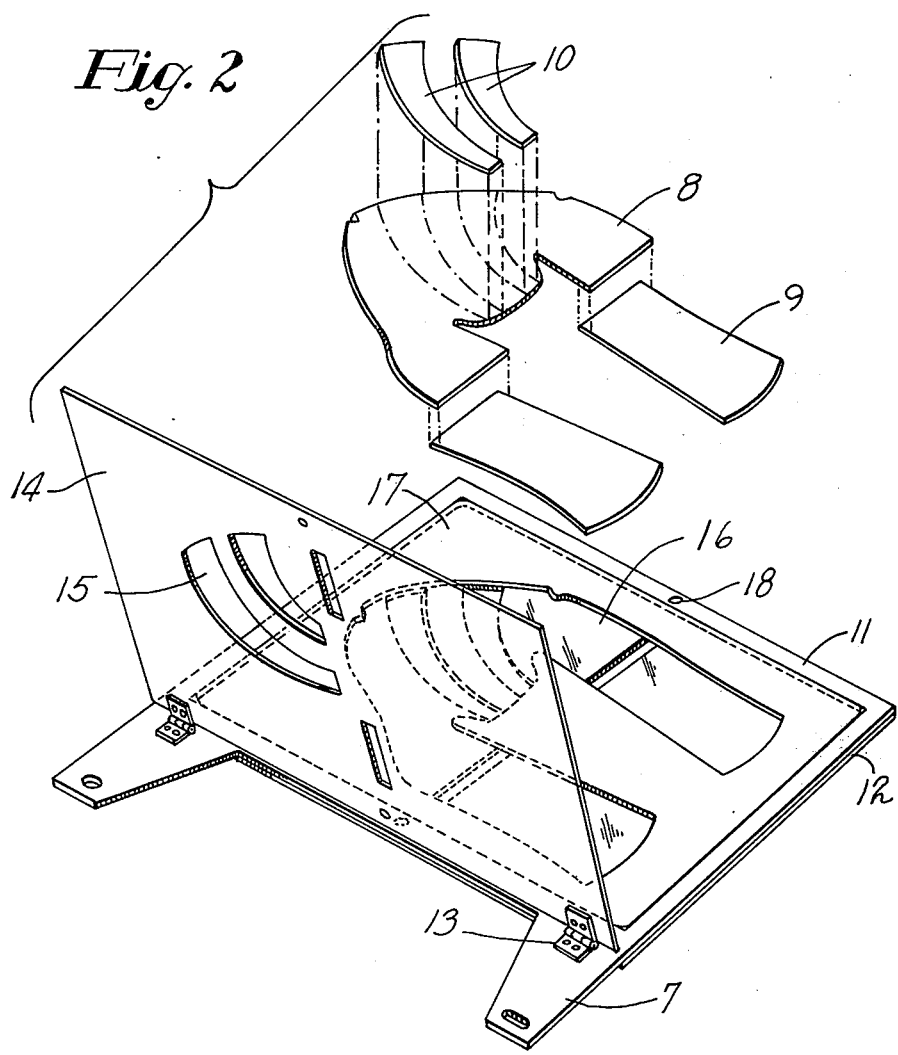
FIG. 2 is a perspective view of a pallet in its open position showing the cavities for locating various parts of a composite workpiece.

This invention as described herein is basically for use with a composite workpiece 22, the parts of which are best shown in FIG. 2, but it can be readily observed that the basic concept may be utilized efficiently even with an individual workpiece. The workpiece 22 may have any shape but for illustration purposes only, it consists herein of a shoe upper which is constructed from quarter portions 9, vamp 8 and overlays 10. Although the invention is particularly useful in the decorative stitching of shoes, it is applicable in any type of stitching.

Figure 1:
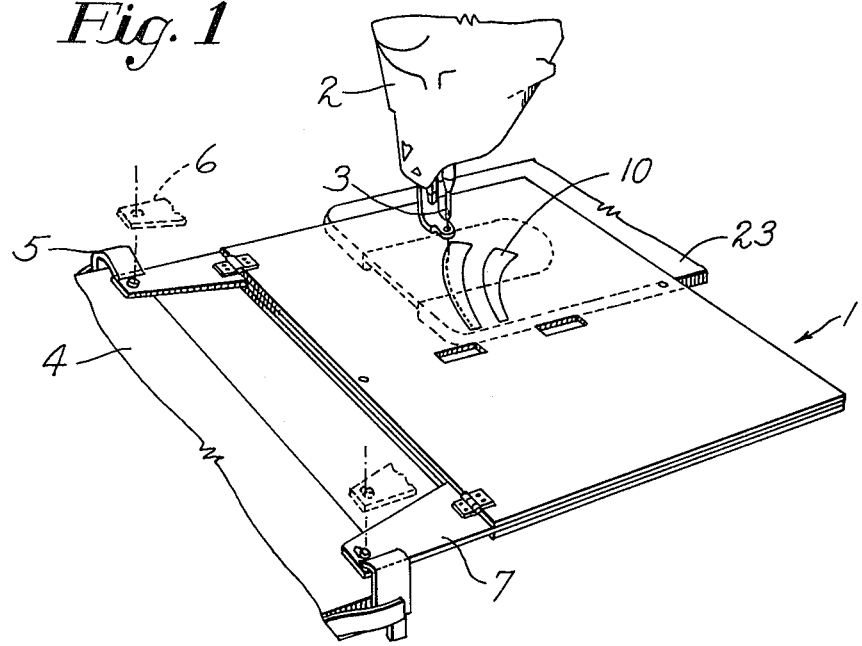
FIG. 1 is a perspective view of a pallet in its operating position in a stitching machine.

As generally shown in FIG. 1, a pallet 1 is provided for supporting the composite workpiece 22 on the automatically controlled carriage 4. The carriage 4 moves the workpiece 22 under the stitching machine 2 according to a predetermined pattern. Carriage 4 has mounting brackets which engage registration holes 6 on the pallet 1. The mounting brackets 5 are constructed to removably secure the pallet 1 in a fixed position in relation to the stitching instruments 3 of the machine 2.

The pallet 1 of this invention is constructed of four basic elements as best shown in FIG. 3. A frame 11 is constructed with mounting arms 7 having registration holes 6 for engagement with the mounting bracket 5 of carriage 4. Frame 11 forms opening 21 for receiving a template 17. A bottom plate 12 is rigidly secured to frame 11 and forms a bottom enclosure for opening 21. Plate 12 is provided with openings 20 to provide access to the workpiece 22 for the stitching instruments 3.

The assembly of plate 12 and frame 11 forms a cavity 21 into which template 17 may be inserted. Template 17 is cut out to form a cavity 16 which is shaped to receive vamp 8 and quarters 9. Cavity 16 is formed to insure proper registration of the workpiece 22 with respect to the stitching instruments 3. When different sizes or styles are desired, template 17 may be replaced without modifying the entire pallet as long as the programmed stitch path does not vary significantly.

Cover plate 14 is mounted by hinges 13 through holes 23 in frame 11 and is provided with access openings 15 and 19 to provide access to the workpiece by stitching instruments 3 from above. Openings 15 are constructed and precisely located to receive the overlays 10 in a fixed position with respect to the stitching instruments.

The pallet assembly 1 is mounted in a registered position by virtue of the engagement between mounting brackets 5 and mounting arms 7. However, the workpiece cavities 15 and 16 must also be accurately registered with respect to the stitching instruments.

There are several ways this may be accomplished depending on the material used to construct the plates and template and the degree of accuracy desired. Extremely close tolerances may be achieved by utilizing the digitized pattern information which controls the machine carriage to register the location of the overlay cavities 15 on the cover plate 14. The greatest degree of accuracy is needed for these cavities since the stitching path 24 must be located very close to the border of the overlay 10 and therefore also near the border of the cavity 15. Slight variances will cause the stitches to run off the overlays 10. By utilizing a prick punch (not shown) in place of sewing instruments 3 the carriage 4 and machine 2 can be used directly for this purpose.

Cover plate 14 is then mounted on frame 11 by hinges 13 which may be secured by bolts or rivets through holes 23. In order to aid in aligning the various plates of pallet 1, locating pins (not shown) may be inserted through aligning holes 18. Once cover plate 14 is accurately secured to frame 11 cavity 16 and openings 19 and 20 may be accurately located by reference to cavity 15. The cavity 16 will serve to locate the vamp 8 and quarters 9 with regard to overlays 10 and generally the tolerances involved in the registration of these parts are not as stringent as the registration of the overlays 10. Therefore, the registration may be comfortably obtained by dependence on the location of cavities 15. Similarly, the openings 20 in bottom plate 12 are for clearance only and need only be registered to the cover plate cavities 15.

The operator of the machine will insert vamps 8 and quarters 9 in the open pallet 1, as shown in FIG. 2. cover plate 14 is then closed by pivoting it on its hinges into engagement with frame 11. The overlays are then positioned in cavities 15 and the composite workpiece 22 is ready for stitching.

It is observed that the vamp 8 and quarters 9 are held in place by cover plate 14 and generally the weight of plate 14 is sufficient for this purpose. However, in some circumstances mechanical holding means may be provided in order to maintain a firm engagement between cover plate 14 and the workpiece portions 8 and 9. Magnets may be mounted on frame 11 to engage and hold cover plate 14 or when there are additional plates as in the pallet of FIG. 7 a simple latch may be provided as shown in this embodiment.

It has been found that overlays 10 must be secured in cavity 15 by some means in order to maintain registration during stitching and this may be easily accomplished by precementing the overlay 10 before placing it in cavity 15.

Figure 5:
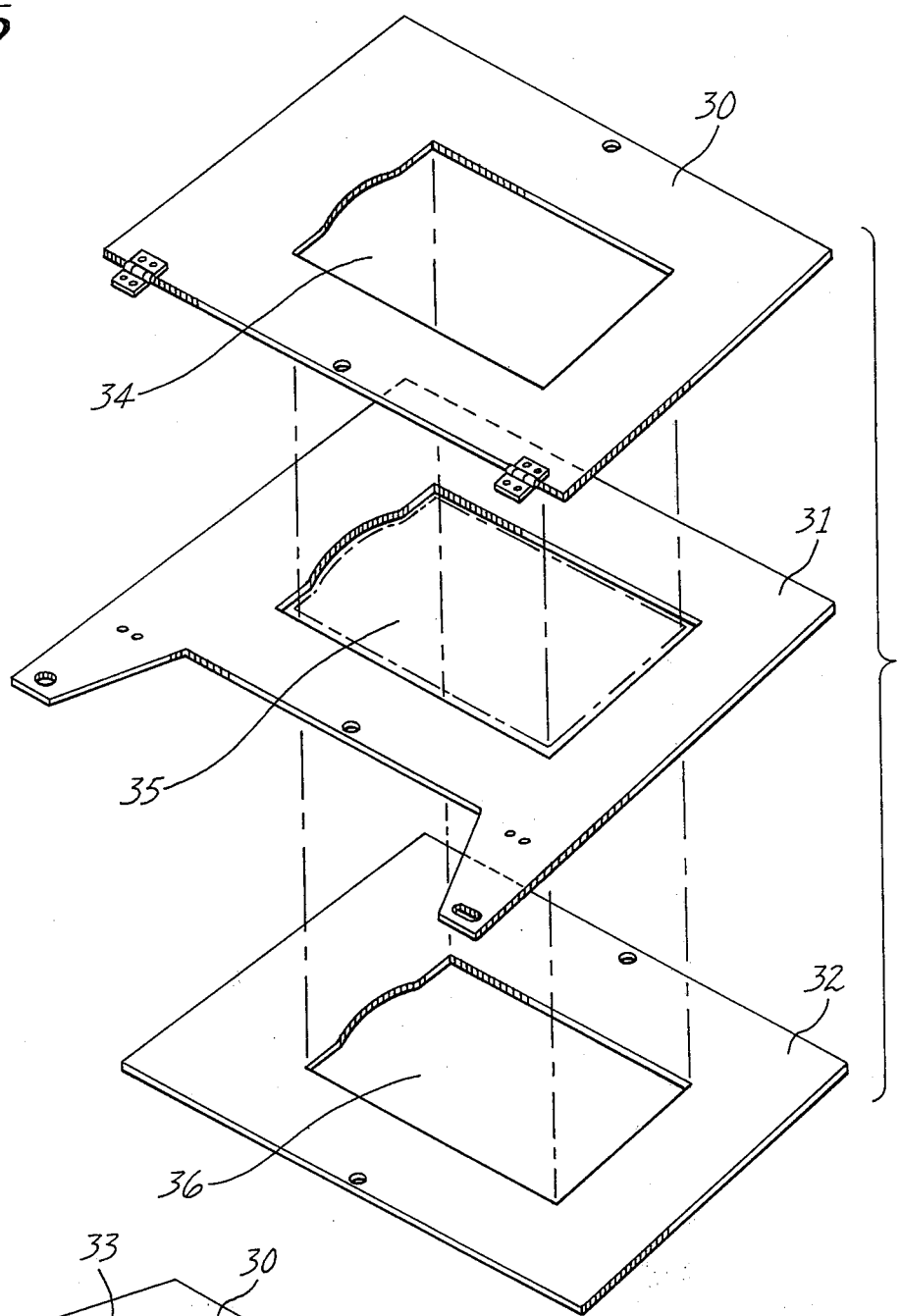
FIG. 5 is an exploded perspective view of an alternate embodiment of the invention for a workpiece which is stitched entirely about its periphery.
Figure 6:
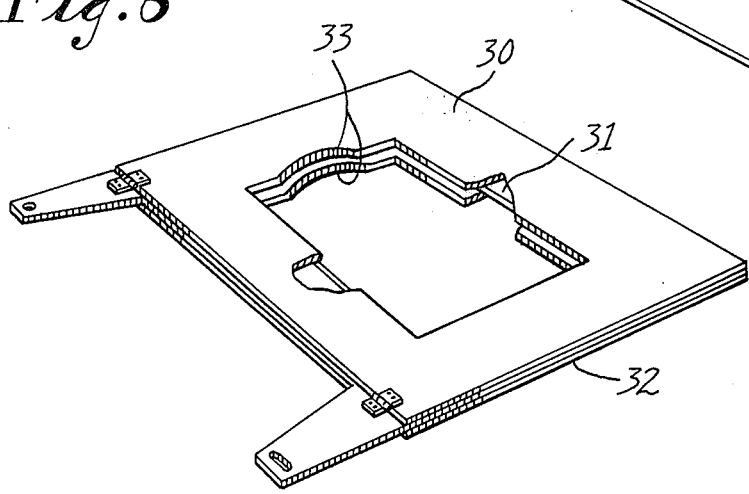
FIG. 6 is a partial cut away view of the pallet shown in FIG. 5.

It was found that the overlay may tend to wrinkle or walk during stitching and in some cases where glueing is not practical an additional cover may be provided which provides an overlapping surface to engage the workpiece close to the stitch path. For example, in the illustration of FIG. 5, a workpiece is used which must be stitched completely about its periphery. The cavity 35 of plate 31 and the access openings 34 and 36 are therefore substantially identical and there is no room for a supporting surface. In this instant the cover and base plate access openings 34 and 36 are constructed in plates 30 and 32 in a reduced size in order to provide a lip 33 for support of the workpiece. In this instance, the periphery of the upper and lower plate openings is very close to the stitching path and the presser foot of the stitching instuments may be allowed to ride on this border creating a force thereon which further secures the workpiece in the pallet. Plates such as elements 34 and 36 can readily be adapted for use with the pallet shown in FIG. 4 or any other pallet according to this invention as the openings therein need only be as large as the stitch path. By providing only enough clearance for the needle to pass, additional surfaces can be provided for engaging and securing the workpiece. A cover plate of this type is also provided in the pallet of FIG. 7 (plates 41 and 44). Of course the overall thickness of the workpiece and pallet limits the number of plates which can be used.

There are finite adjustments available to the operator to calibrate the machine after pallet 1 is mounted on carriage 4. These fine adjustments insure accurate registration of the overlays 10 with respect to stitching instruments 3, but are only of assistance providing the overlays 10 are initially accurately located on the pallet 1.

Since more than one pallet will utilized in successive operations, it is necessary to construct substantially identical pallets in order to avoid continuous fine adjustments of the machine after each pallet is mounted. This may be done by making one set of the holes 23 oversized and using bolts for securing the hinges. This will allow for some adjustment of the location of the overlays 10 in the cavity 15 in order to match pallet to pallet after the machine is calibrated. Once this is accomplished, the hinges are secured and the operation should proceed without further adjustment.

The overall pallet configuration will necessarily vary with the type, style and size of the workpiece but in general all will consist of a combination of cavity or registration plates and cover or clamping plates. The former plates being constructed to receive the workpiece and the latter plates being constructed to provide acess openings to the workpiece and support thereof. The combination is preferalby hinged together to form a sandwich type assembly. As in the plate 14 of the embodiment shown in FIG. 3 certain aspects of the cover and cavity plates may be combined.

The cover plates form the outer layers of the sandwich assembly and in general need only have access openings which provide needle clearance to the workpiece. As shown in the upper an lower plates 41 and 44 of the pallet of FIG. 7 ample overlapping supporting surfaces are thereby provided for the composite workpiece. In order to insure firm engagement an overall latch as at 50 in FIG. 7 may be provided, and to insure against movement of the workpiece pins 49 may also be constructed in one of the cover plates. The openings in the cover plates must be mutually inclusive, but they may vary in overall size.

The cavity plate forms the basis for registering the workpiece and therefore must be accurately located with respect to the stitching instruments. Although it is desirable for the cavity to be coextensive with the workpiece in order to limit the movement of the workpiece, when other limiting means (pins, glue, etc.) are provided, the cavities may be oversized to accommodate different sizes. When the cavity is constructed in this manner, it is essential that at least one border be permanent and unchanging with size. This border will form the reference for registering the workpiece and will be constructed in the plate in accurate position with respect to the stitching instruments.

When only an individual workpiece is being stitched, the registering plate need not have a cavity but may be registered by the use of outlines on the cover plate or pins and other means. In this instance, only two cover plates would be used, one of which being additionally used as the registering plate.

ALTERNATE EMBODIMENT

In order to illustrate the flexibility of the subject invention, a pallet for use with a more elaborate composite workpiece comprised of a variety of parts of a shoe is shown in FIG. 7.

As best shown in FIGS. 8 and 9, in this operation, the vamp 45 must be stitched along an overlapping edge of a tip 46. Similarly, quarters 47 are to be stitched along an overlapping edge of foxing 48.

Referring now to FIG. 7, a pallet for use in stitching the composite workpiece described above is shown. This pallet consists of an upper clamping plate 41, two cavity plates 42 and 43 and a lower clamping plate 44. The clamping or cover plates 41 and 44 have matching openings 52 and 53 therein which provide access to the workpiece for the stitching instruments and conform to the stitching pattern.

A cavity plate is provided for each group of overlapping parts, namely, one plate for the tip and foxing portions 46 and 48 and one plate for the vamp and quarter portions 45 and 47. More specifically, cavities 55 are formed in plate 42 for receiving tip 46 and foxings 48 and cavities 54 are formed in plate 43 to receive vamp 45 and quarters 47. The cavities 54 and 55 are oversized to accommodate a group of sizes, but have edges 58, 59 and 60 which may be accurately positioned to form a reference point in order to register the various parts on the pallet. Since in this particular instance the quarters 47 do not grade with size, the corresponding cavity may be coextensive therewith.

The plate 43 is provided with means to engage the clamps 5 of workpiece support carriage 4 and also has a latch 50 mounted thereon. Plate 44 is rigidly secured to plate 40 and forms a bottom enclosure for cavities 54, Plates 41 and 42 are secured to plate 43 by hinges 51 and both plates have apertures 56 and 57 through which the latch 50 may pass.

In operation, the assembled pallet is opened by pivoting plates 41 and 42 on their hinges 51 to expose cavities 54 in plate 43. Vamp 45 and quarter 47 are then placed in their respective cavities making sure the pieces are firmly against the registration edge 58. Plate 42 is then pivoted over plate 43 and tip 46 and foxings 48 are placed therein, again making sure that the pieces are firmly against registration edges 59 and 60. Upper clamping plate 41 is then pivoted into place and secured by latch 50. As previously discussed, in this instance it is necessary to provide a holding mechanism to insure that the pieces will remain in place. Accordingly, pins 49 are provided on the interior face of plate 41 and such pins pierce the workpiece preferably in a position which will be hidden in the finished shoe. The assembled pallet may then be placed on the machine carriage 4 for stitching.

It has been found that in this manner a device is fabricated which allows for the efficient registration and transfer of workpieces.

I claim:

1. In a stitching machine which utilizes an automatically controlled carriage for moving the workpiece in relation to the stitching instruments, a device for registering and securing the workpiece in a fixed position on the carriage with respect to the instruments, comprising:
   A. A base plate having a cavity therein to receive the workpiece and limit the movement thereof said cavity conforming to the shape of the workpiece and being registered in a fixed position with respect to the instruments, said base plate further having openings therein to allow access to the workpiece for the stitching instruments;
   B. A cover plate removably secured to the base plate to enclose the workpiece, said cover plate having opening therein to allow access to the workpiece for the stitching instruments, said openings being in fixed registration with said instruments; and
   C. Means for removably securing the base plate to the automatically controlled carriage.

2. In a stitching machine which utilizes an automatically controlled carriage for moving a workpiece in relation to the stitching instruments, a device for registering and securing a workpiece in a fixed position on the carriage with respect to the instruments, as described in claim 1 wherein the cover plate is secured to the base plate by means of hinges which allow the cover plate to pivot away from the base plate to expose the cavity therein.

3. In a stitching machine which utilizes an automatically controlled carriage for moving the workpiece in relation to the stitching instruments, a device for registering and securing the various parts of a composite workpiece in a fixed position on the carriage with respect to the instruments, said composite workpiece including base and overlay portions, comprising:
   A. A base plate having a cavity therein to receive the base of the workpiece, said cavity being registered in a fixed position with respect to the instruments, said base plate further having openings therein to allow access to the workpiece;
   B. A cover plate removably secured to the base plate to enclose the base cavity, said cover plate having openings therein to allow for access to the workpiece and for providing a cavity to receive the overlays in fixed registration with the instruments; and
   C. Means for removably securing the base plate to the automatically controlled carriage.

4. In a stitching machine which utilizes an automatically controlled carriage for moving a workpiece in relation to the stitching instruments, a device for registering and securing a composite workpiece in a fixed position on the carriage with respect to the instruments, said composite workpiece including base and overlay portions, as described in claim 3 wherein the cover plate is secured to the base plate by means of hinges which allow the cover plate to pivot away from the base plate to expose the base cavity.

5. In a stitching machine which utilizes an automatically controlled carriage for moving a workpiece in relation to the stitching instruments, a device for registering and securing a composite workpiece in a fixed position on the carriage with respect to the instruments, said composite workpiece including base and overlay portions, as described in claim 3 wherein the base plate comprises:
   A. A frame member having an opening therein:
   B. A bottom plate secured to the frame member and providing a bottom enclosure to the frame member opening; said bottom plate having openings therein to allow access to the workpiece; and
   C. A template which is removably secured in full registration within the frame member opening, said template being cut out to form a cavity within the base plate which conforms to the size and shape of the workpiece.

6. In a stitching machine which utilizes an automatically controlled carriage for moving the workpiece in relation to the stitching instruments, a device for registering and securing a plurality of parts of a composite workpiece in a fixed position on the carriage with respect to the stitching instruments, comprising:
   A. A plurality of registration plates having cavities therein to receive the parts of the composite workpiece, at least one border of each of said cavities being accurately registered with respect to the stitching instruments, the first of said registration plates being adapted for mounting on the automatically controlled carriage and the remaining registration plates being pivotally secured to a surface of said first registration plate; and
   B. A pair of clamping plates having openings therein to allow access for the stitching instruments to the workpiece, said openings conforming to the stitch pattern; one of said plates being secured to the lower surface of the first registration plate and the second of said plates being pivotally secured to the upper surface of the assembly of registration plates to allow said second plate to pivot away from the registration plates to expose the cavities therein.

7. In a stitching machine which utilizes an automatically controlled carriage for moving the workpiece in relation to the stitching instruments, a device for registering and securing a plurality of parts of a composite workpiece in a fixed position on the carriage with respect to the stitching instruments as described in claim 6 further comprising means to firmly but removably secure the assembly of clamping plates and registration plates in the closed position.

8. In a stitching machine which utilizes an automatically controlled carriage for moving the workpiece in relation to the stitching instruments, a device for registering and securing a plurality of parts of a composite workpiece in a fixed position on the carriage with respect to the stitching instruments as described in claim 6 further comprising means for engaging the parts of the workpiece to maintain said parts in registered alignment during the stitching operation.

* * * * *